United States Patent
Dahlfort et al.

(10) Patent No.: US 9,031,408 B2
(45) Date of Patent: May 12, 2015

(54) METHOD FOR FAST WAVELENGTH DIVISION MULTIPLEXING (WDM) PASSIVE OPTICAL NETWORK (PON) INITIALIZATION IN HETEROGENEOUS NETWORKS

(75) Inventors: Stefan Dahlfort, Santa Clara, CA (US); David Hood, Palo Alto, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 814 days.

(21) Appl. No.: 13/157,017

(22) Filed: Jun. 9, 2011

(65) Prior Publication Data

US 2012/0315040 A1    Dec. 13, 2012

(51) Int. Cl.
*H04B 10/20* (2006.01)
*H04J 14/02* (2006.01)

(52) U.S. Cl.
CPC ......... *H04J 14/0282* (2013.01); *H04J 14/0246* (2013.01); *H04J 14/025* (2013.01); *H04J 14/0257* (2013.01); *H04J 14/0258* (2013.01); *H04J 14/026* (2013.01); *H04J 14/0267* (2013.01); *H04J 14/0269* (2013.01)

(58) Field of Classification Search
CPC .............. H04J 14/0226; H04J 14/0227; H04J 14/0228; H04J 14/0239; H04J 14/0247
USPC ......................................... 398/58, 66, 70–72
See application file for complete search history.

(56) References Cited

U.S. PATENT DOCUMENTS

| | | | |
|---|---|---|---|
| 7,002,697 B2 | 2/2006 | Domash et al. | |
| 7,706,643 B1 | 4/2010 | Meli et al. | |
| 8,369,706 B2 | 2/2013 | Sorin | |
| 8,457,165 B2 | 6/2013 | Liu et al. | |
| 8,462,656 B2 | 6/2013 | Zhou et al. | |
| 8,548,328 B2 | 10/2013 | Hood | |
| 2002/0021471 A1* | 2/2002 | Tsuruta | 359/168 |
| 2004/0218534 A1 | 11/2004 | Song et al. | |
| 2006/0115271 A1 | 6/2006 | Hwang et al. | |
| 2008/0013950 A1 | 1/2008 | Boudreault et al. | |

(Continued)

FOREIGN PATENT DOCUMENTS

EP    2296336    8/2009

OTHER PUBLICATIONS

ITU-T; G.987.3; 10-Gigabit-capable passive optical networks (XG-PON): Transmission convergence (TC) specifications; Oct. 2010; 11 pages.

(Continued)

*Primary Examiner* — Dzung Tran
(74) *Attorney, Agent, or Firm* — Nicholson De Vos; Webster & Elliott LLP

(57) ABSTRACT

A method provides advertisements to optical network units (ONUs) by an optical line terminal (OLT), wherein the advertisements enable the ONUs to identify free channels from a plurality of wavelength-division multiplexing (WDM) channels in a passive optical network (PON). The method includes: transmitting from the OLT to the ONUs an advertisement identifying a free channel for each of a plurality of incompatible channel (ICH) groups, receiving a request from an ONU for the advertised free channel of an ICH group, authenticating the requesting ONU via the advertised free channel, allocating the advertised free channel to the requesting ONU upon successful authentication of the requesting ONU, and transmitting an updated advertisement from the OLT to the ONUs.

18 Claims, 11 Drawing Sheets

(56) References Cited

U.S. PATENT DOCUMENTS

| | | | |
|---|---|---|---|
| 2009/0162065 A1* | 6/2009 | Mizutani et al. | 398/66 |
| 2009/0185807 A1 | 7/2009 | Lee et al. | |
| 2009/0226182 A1 | 9/2009 | Adamiecki et al. | |
| 2010/0183030 A1 | 7/2010 | Lou et al. | |
| 2011/0085795 A1* | 4/2011 | Ozaki | 398/25 |
| 2011/0142444 A1* | 6/2011 | Borges et al. | 398/25 |
| 2012/0128360 A1 | 5/2012 | Lee et al. | |
| 2013/0136447 A1* | 5/2013 | Cavaliere et al. | 398/49 |

OTHER PUBLICATIONS

ITU-T; G.984.3; Gigabit-capable Passive Optical Networks (G-PON): Transmission convergence layer specification, Mar. 2008, 17 pages.

U.S. Appl. No. 13/236,360, filed Sep. 19, 2011.

"Common Public Radio Interface (CPRI); Interface Specification", http://www.cpri.info/downloads/CPRI, CPRI Specification V4.2, Sep. 29, 2010, 113 pgs.

Non-Final Office Action, U.S. Appl. No. 13/352,956, dated Aug. 30, 2013, 31 pages.

10-Gigabit-capable passive optical networks (XG-PON): Transmission convergence (TC) specifications; International Telecommunication Union, Oct. 2010, pp. 1-63.

Gigabit-capable Passive Optical Networks (G-PON): Transmission convergence layer specification; Telecommunication Standardization Sector of ITU; Mar. 2008; pp. 30-48.

Final Office Action, U.S. Appl. No. 13/352,956, dated Feb. 6, 2014; 33pgs.

Advisory Action, U.S. Appl. No. 13/352,956, dated May 15, 2014; 3pgs.

Notice of Allowance, U.S. Appl. No. 13/352,956, dated Jun. 5, 2014; 9pgs.

* cited by examiner

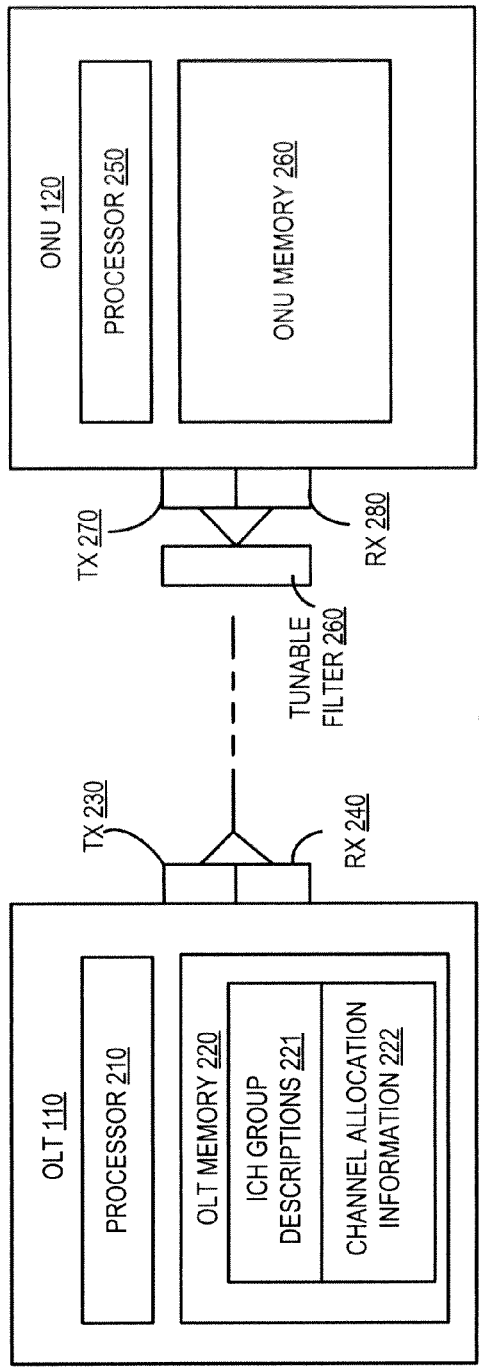 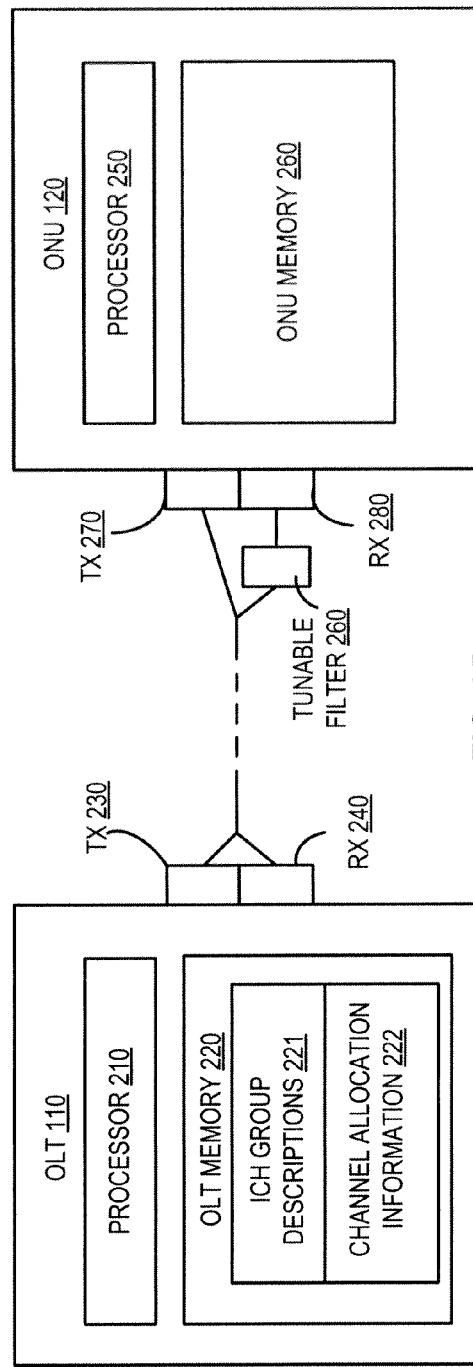

METHOD FOR FAST WAVELENGTH DIVISION MULTIPLEXING (WDM) PASSIVE OPTICAL NETWORK (PON) INITIALIZATION IN HETEROGENEOUS NETWORKS

FIELD OF THE INVENTION

Embodiments of the invention relate to a passive optical network (PON). More specifically, embodiments of the invention relate to a method and system for fast initialization of a PON in a heterogeneous network.

BACKGROUND

A passive optical network (PON) consists of a central office node (also called an optical line terminal (OLT)), one or ore subscriber nodes (also called optical network units (ONUs) or sometimes optical network terminations (ONTs)), and the fibers and splitters between them (called an optical distribution network (ODN)). One type of PON is a wavelength division multiplexing (WDM) PON, which multiplexes a number of optical carrier signals onto a single optical fiber by using different wavelengths (colors) of laser light.

A WDM PON may or may not include wavelength selectivity in the structure of the ODN itself, for example, by the incorporation of arrayed waveguides (AWGs), each of whose physical ports selects one, or possibly two, specific wavelengths. If the ODN is wavelength-selective, the ONU and OLT are constrained by their physical connectivity to use one, or possibly two, specific wavelengths.

It is also possible for the ODN to not be wavelength selective, in which case the possibility is open for the OLT and ONU to communicate on any of a plurality of wavelengths.

WDM PONs may be very heterogeneous. For example, wavelength channels can have different data rates and use different protocols; e.g., 1 and 10 Gigabit Ethernet; 1.25, 2.5, 6 and 10 G common public radio interface (CPRI), and other services, modulation formats and protocols. For cost and technical reasons, both OLT ports and ONUs may be able to handle only one or at most a subset of these variants. Moreover, wavelength channels ay be provided by different service providers, each of which may assign wavelength channels either in a pre-assigned static way, or dynamically. Some channels may use error correction/encryption and some may not. Some channels may be put into sleep mode, which is pertinent to the present invention because at a given time, there may be no signal present on a wavelength that is nevertheless allocated and in use.

SUMMARY

A method provides advertisements to optical network units (ONUs) by an optical line terminal (OLT), herein the advertisements enable the ONUs to identify free channels from a plurality of wavelength-division multiplexing (WDM) channels in a passive optical network (PON). The method comprises the steps of:
transmitting from the OLT to the ONUs an advertisement characterizing a plurality of incompatible channel (ICH) groups and identifying a free channel for each ICH group, wherein each of the ICH groups has a different set of supported capabilities;
receiving a request from one of the ONUs for the advertised free channel of one of the ICH groups, the supported capabilities of the one of the ICH groups matching the needs (e.g., the capabilities and service requirements) of the requesting ONU;
authenticating the requesting ONU via the advertised free channel;
allocating the advertised free channel to the requesting ONU upon successful authentication of the requesting ONU;
and transmitting an updated advertisement from the OLT to the ONUs, the updated advertisement indicating that a different one of the free channels is now available for allocation within the specific ICH group.

A method receives advertisements from an OLT by an ONU, wherein the advertisements enable the ONU to identify free channels within ICH groups of interest from a plurality of WDM channels in a PON. The method comprises the steps of:
scanning through the channels until a readable channel that carries an advertisement is found, the advertisement characterizing a plurality of ICH groups and identifying a free channel for each, wherein each of the ICH groups has a different set of supported capabilities;
comparing the supported capabilities of the advertised ICH groups with the needs of the ONU to determine if there is a match;
sending a request for the advertised free channel of a particular ICH group upon determining that there is a match between that ICH group and the ONU's needs;
receiving an allocation of the advertised free channel upon authentication of the ONU;
and using the newly-allocated advertised free channel for the subsequent transport of client data.

A network element of an OLT provides advertisements to ONUs, wherein the advertisements enable the ONUs to identify ICH groups and a free channel within each ICH group from a plurality of WDM channels in a PON. The OLT comprises:
a transmitter adapted to transmit to the ONUs an advertisement characterizing a plurality of ICH groups and identifying a free channel for each ICH group, wherein each of the ICH groups has a different set of supported capabilities;
a receiver adapted to receive from one of the ONUs for the advertised free channel of one of the ICH groups, a request for assignment of the advertised free channel to the requesting ONU;
and a processor coupled to the receiver and the transmitter. The processor is adapted to authenticate the requesting GNU via the advertised free channel, allocate the advertised free channel to the requesting GNU upon successful authentication of the requesting ONU, and transmit an updated advertisement to indicate that a different one of the free channels is now available for allocation in the particular ICH group.

A network element of an ONU receives advertisements from an OLT, wherein the advertisements enable the ONU to identify ICH groups and free channels within the ICH groups from a plurality of WDM channels in a PON. The ONU comprises:
means for the GNU to adapt its optical transmitter and receiver to any of a plurality of wavelengths, including at least some of the wavelengths advertised by the OLT
a receiver adapted to scan through the wavelength channels until a readable channel that carries an advertisement is found, the advertisement characterizing a plurality of ICH groups and offering a free channel for each ICH group, wherein each of the ICH groups has a different set of supported capabilities;

a processor coupled to the receiver. The processor is adapted to compare the supported capabilities of each advertised ICH group with the needs of the GNU to determine if there is a match;

a transmitter coupled to the processor. The transmitter is adapted to send a request for the advertised free channel when the processor determines that there is a match, and to use the channel for client services when authorized by the OLT.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 2A is a diagram of one embodiment of an OLT and an ONU.

FIG. 2B is a diagram of an alternative embodiment of an OLT and an ONU.

DETAILED DESCRIPTION

Figure 1:
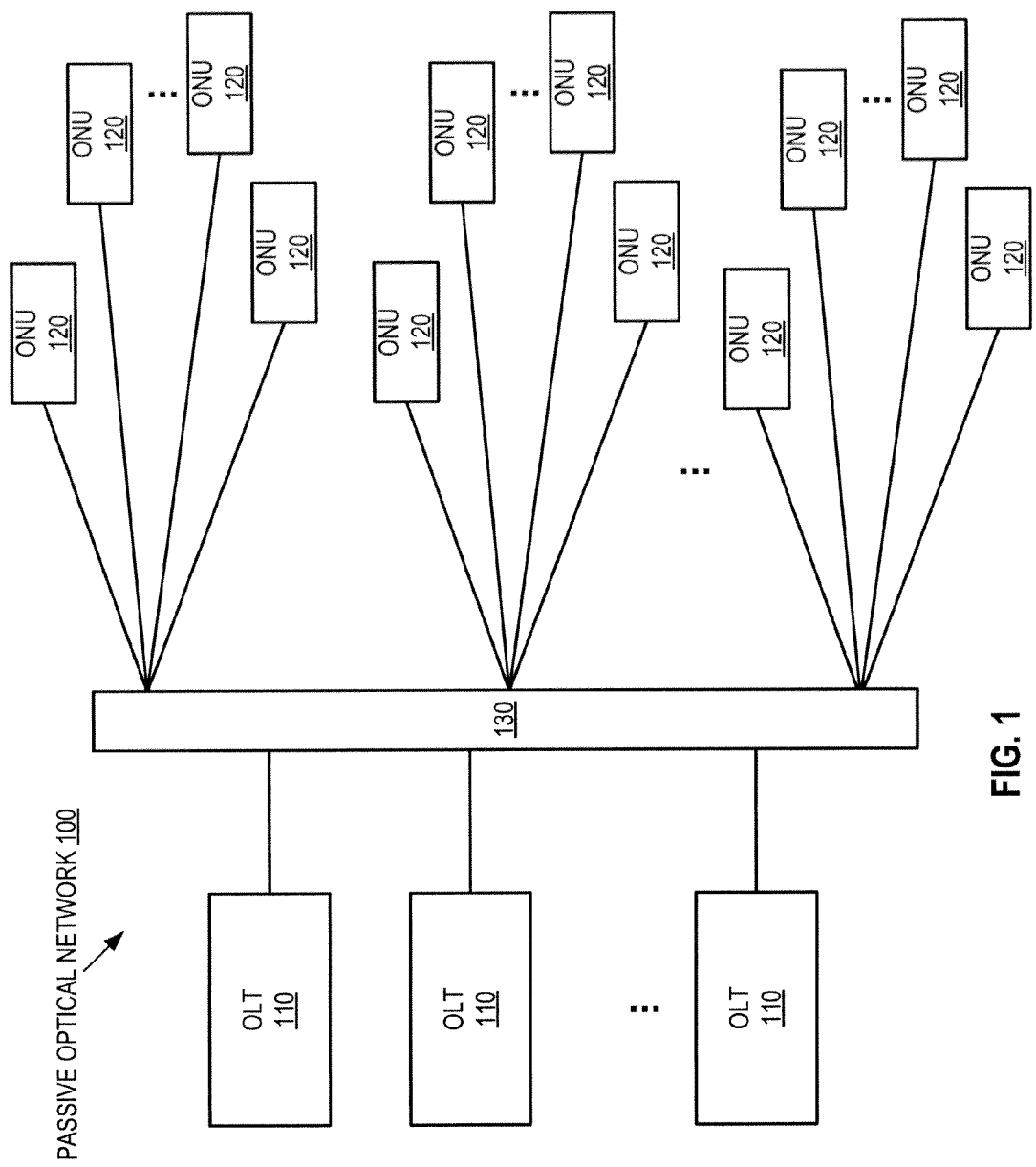
FIG. 1 is a diagram of one embodiment a PON implementing fast initialization architecture.

In the following description, numerous specific details are set forth. However, is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

According to an embodiment of the invention, a PON in a heterogeneous network comprises a plurality of incompatible channel (ICH) groups of wavelengths. The distinction between one ICH group and another may be based on the modulation format, bit rate, service provider identity, or any number of other discriminators, according to the policies of the network provider and the services offered. By way of illustration and not as a limitation, one ICH group may comprise channels capable of delivering gigabit Ethernet (GbE) service; a second ICH group may comprise channels capable of delivering ten gigabit Ethernet (10 GE) service; a third ICH group may comprise channels that are capable of dynamically adapting to either GbE or 10 GE service.

It is expected that a given ONU will have ICH group requirements, for example, of signal rate and format, and other ICH group preferences, for example, of a specific service provider. The present invention permits an ONU to identify a suitable ICH group from a plurality of ICH groups on a PON, to register itself with that ICH group, and to receive a wavelength (channel) assignment for subsequent use in delivering normal telecommunications services to end users (hereafter referred to as client data).

It is possible to specify the OLT and ONU wavelength through out-of-band means, for example, through written contractual documents, but there are strong business incentives to offer an open pool of wavelength resources to all potential customers, and negotiate the choice of wavelength dynamically. Depending on the operator's policy, the resulting channel assignment may be semi-permanently associated with a given client, or may be regarded as a lease, to be re-negotiated from time to time or upon reinitialization.

The dynamic wavelength negotiation process described herein avoids transmission on already assigned channels, even if these channels may be silent at any given time, for example, due to failure or energy conservation measures. Because a channel may already be allocated, it is not acceptable for the ONU to simply transmit a channel allocation request on any and all arbitrary channels that may be accessible within the hardware capabilities of the OLT or ONU.

The disadvantages of the prior art include a slow initialization process that is not only time consuming but is also prone to interfere with occupied channels, or in its manually provisioned form, impedes quick and efficient service negotiation and resource usage. This is because an ONU cannot easily locate a compatible free channel in heterogeneous networks. Embodiments of the present invention overcome these disadvantages of the prior art. In order for an ONU to quickly find an available wavelength, a fast and efficient initialization procedure is provided.

Embodiments of the invention enable fast initialization of a WDM PON in complex heterogeneous networks, wherein the PON connects OLTs to ONUs by wavelength channels that may be incompatible; e.g., because of different protocols, service types, data rates, service providers, FEC modes, encryptions, or other characteristics. These mutually incompatible channels may be grouped into multiple incompatible channel (ICH) groups. Channels in different ICH groups support different capabilities. Channel assignment is facilitated by using downstream advertisements to allow an ONU to quickly identify a compatible ICH group and negotiate for a channel assignment. The fast initialization saves power because active channels can be placed in the sleep mode and unused channels can be shut down, without fear of pre-emption by newly arriving ONUs. Only one free channel per OLT and per ICH group need be opened. Embodiments of the invention also coordinate channel advertisements among several OLTs to avoid stranding unused channels and to allow OLTs to use as few channels as possible, thereby releasing capacity for possible use by other OLTs.

Embodiments of the invention provide a fast and efficient initialization procedure of an ONU to quickly find an available wavelength (also referred to as a free channel) that is compatible with its ICH needs. This free channel complies with the OLT-ONU master-slave paradigm, which means that the OLTs are in full control of the wavelength channels used by the ONUs. An ONU can quickly find a free channel even though some channels may be in the sleep mode. Embodiments of the invention eliminate the risk of an ONU intercepting and disturbing other users and wavelength channels.

FIG. 1 is a diagram of one embodiment of a passive optical network (PON) 100 implementing a fast initialization architecture. The PON 100 includes a set of optical line terminals (OLTs) 110 and a set of optical network units (ONUs) 120. The OLTs 110 and the ONUs 120 are connected via an optical distribution network (ODN) 130 in a many-to-many topology. The OLTs 110 can be operated by or belong to one or more network service providers. The ONUs 120 are devices that terminate the PON 100 and present telecommunications service interfaces to the subscribers.

In the following descriptions, the term "downstream" refers to the direction of transmission from the OLTs 110 to the ONUs 120, and the term "upstream" refers to transmission from the ONUs 120 to the OLTs 110.

FIG. 2A and FIG. 2B are diagrams of two alternative embodiments of the OLT 110 and the ONU 120. In one embodiment, the OLT 110 includes a transmitter 230 and a receiver 240. The OLT transmitter 230 transmits downstream client signals on channels allocated to the ONUs 120, as well as advertisements identifying ICH groups and free channels that are available for allocation. The OLT 110 also includes a processor 210 and an OLT memory 220. The OLT memory stores, among other data, incompatible channel (ICH) group descriptions 221 and channel allocation information 222. The ICH group descriptions 221 describe wavelength channels (referred to as "channels" for simplicity) provided by this OLT 110, where the channels are grouped by their compatibility. Channels that are mutually incompatible belong to different ICH groups. Channels may be considered incompatible if they have different data rates (e.g., 1G, 10G, etc.), different error correction schemes (e.g., forward error correction (FEC), no error correction, etc.), different protocols (e.g., gigabit Ethernet (GbE), CPRI, etc.), different encryption, different service types (e.g., "business service, high availability," "residential service, best efforts," "residential service, high quality," "IPv6," "fiber channel over GbE," etc.) or other characteristics. For example, if the ONU 120 can demodulate either 1 G or 10 G Ethernet data rates but not both, it would regard 1 G and 10 G channels as incompatible channels (ICHs).

In one embodiment, the channel allocation information 222 includes the information of the channels that have been allocated by the OLT 110 to each ICH group, and the information of free channels that can be allocated by the OLT 110. The information 222 for each ICH group can include the service provider, the protocol, the service type, the data rate, the FEC mode, encryption, whether or not in sleep mode, and other information.

In one embodiment, the ONU 120 includes a transmitter 270 for transmitting upstream signals to the OLT 110 and a receiver 280 for receiving downstream signals from the OLT 110. The ONU 120 also includes a processor 250 and an ONU memory 260 that stores configuration data. Additionally, the ONU 120 is tunable, which means that the ONU 120 can adjust its own working wavelength. For example, the ONU 120 can include a tunable filter 260. In the embodiment of FIG. 2A, both the transmitter 270 and the receiver 280 are coupled to a tunable filter 260, which determines the working wavelength of the ONU 120 both on the transmit and receive sides. In the embodiment of FIG. 2B, only the receiver 280 is coupled to the tunable filter 260, while the transmitter is understood to be directly tunable by the ONU processor 250, for example by comprising a tunable laser. In both cases, it is understood that tuning of the filter 260 is under the control of the ONU processor 250, so that in both cases, the ONU is capable of controlling both its transmit and receive wavelengths.

It will be appreciated that the OLT transceivers may be either wavelength tunable or not. In the case of multiple OLTs, a PON may have a mix of fixed and tunable OLTs. If the transceivers of a given ICH are tunable, and because ONUs are always understood to be tunable, at least within some range, then any unused wavelength within that range is a potential candidate for the given ICH. If the OLT transceivers of a given ICH group are not tunable, then that ICH group is constrained to use only the accordingly fixed set of wavelengths. This OLT flexibility, or lack thereof, does not affect the operation of the present invention, except in possibly constraining the subset of wavelengths available for allocation.

In one embodiment, the GNU receiver 280 either can or cannot recognize and decode a given downstream advertisement for an ICH group. For example, a 1 GbE receiver would be unable to recognize a 10 G signal that advertised a 10 GE ICH group. Even at the same data rate, the ONU receiver 280 may be unable to recognize higher-layer constructs of a signal. For example, a receiver for receiving CPRI signals at 2.5 G may be unable to recognize GPON signals at 2.5 G. Thus, in some embodiments, it is not necessary to configure the ONU 120 with an ICH group identifier, as the ONU 120 is only able to recognize signals transmitted on the channels of its own ICH group.

In some scenarios where two ICH groups are distinguished by factors other than data characteristics (e.g., different service providers but the same data rate and the same protocol), the ONU 120 can read the advertisements for these ICH groups and determine which advertisement is relevant to itself.

Figure 3:
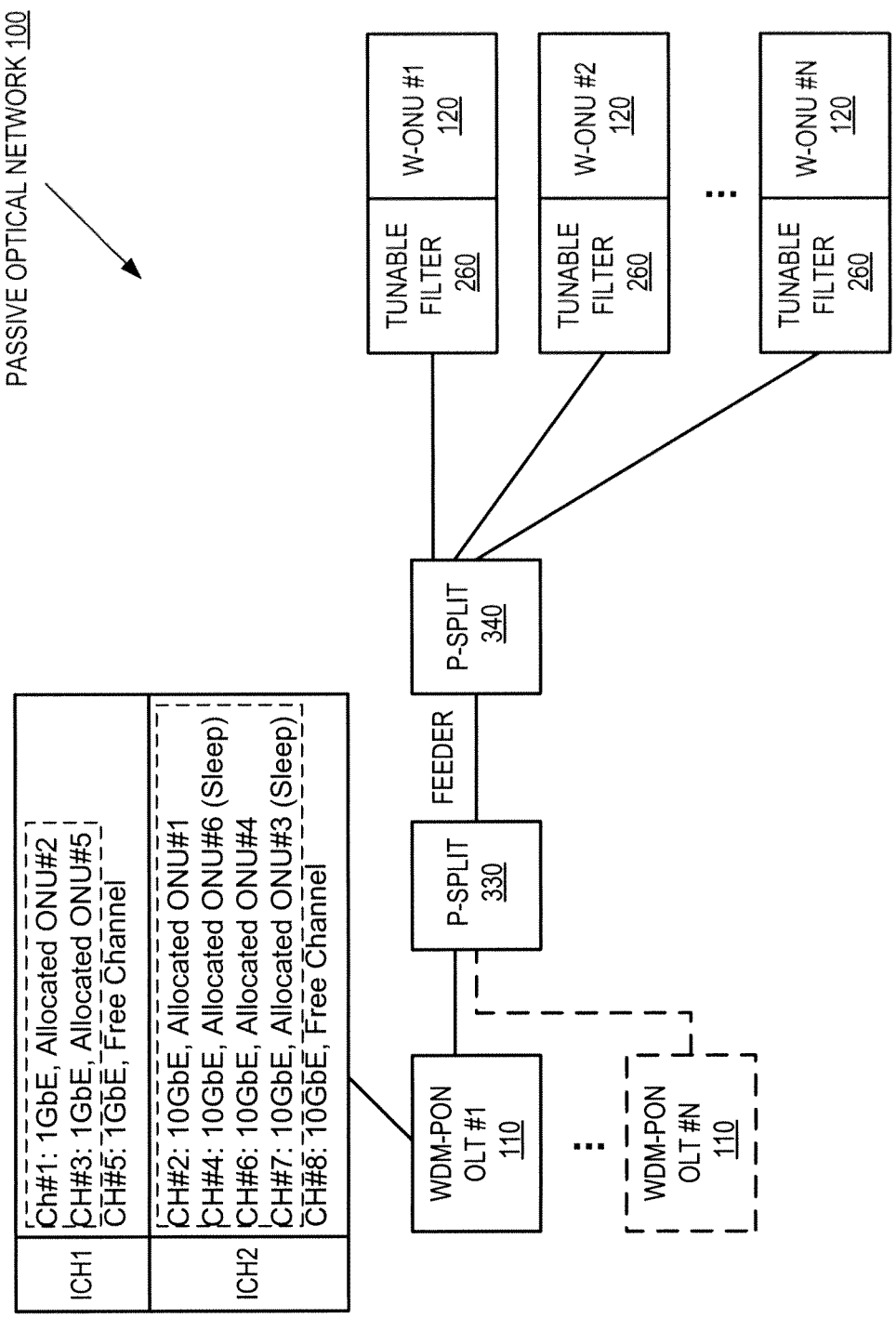
FIG. 3 is a diagram of one embodiment of the PON of FIG. 1 with further details in a WDM portion.

FIG. 3 is a diagram of one embodiment of the PON 100 of FIG. 1 with further details in the WDM portion of the PON 100. In this embodiment, the WDM ONUs 120 ("W-ONUs" or "ONUs" hereinafter) are connected to a power splitter 340 ("p-split"), and the channels provided by a plurality of WDM OLTs 110 are separated by another p-split 330. The power splitter 340 distributes signals toward the ONUs 120. Each of the ONUs 120 is tunable to thereby be adapted to a desired wavelength.

In one embodiment, the OLT 110 (e.g., OLT#1) transmits advertisements to the ONUs 120 with information on ICH groups and free channels. The advertisements identify one free channel for each ICH group. The advertisement identifying each ICH group can include one or more of the following: a data rate, a protocol, a wavelength, wavelength spacing, a service provider, a service type, an error correction mode (or no error correction), and an encryption scheme (or no encryption), and the identity of a free channel that is available for allocation. In some embodiments, information on already allocated channels can also be advertised. The information can include one or more of the following: channel identifiers, data rates, identifiers of the ONUs receiving the allocation, whether or not the channels in sleep mode, and other information. The advantage of advertising allocated channels is that an ONU that reinitializes for any reason may be able to determine its right to a given channel and resume using it without renegotiation.

As mentioned above, the advertisements identify one free channel for each ICH group. For example, if both 1 G and 10 G data rates can be used in the PON 100, and if it is possible that the ONU 120 may not be capable of dynamically adapting to either, the OLT 110 will advertise these two data rates as two separate ICH groups.

In one embodiment, the OLT 110 periodically sends the downstream advertisement on each free channel. In another embodiment, the OLT 110 can completely shut down all unused channels (free channels), except one advertised free channel for each ICH group.

In one embodiment, the OLT 110 sends in-band advertisements periodically on one or several free channels. In another embodiment, the OLT may also (or instead) transmit advertisements on one or more active (assigned) channels. If the OLT is to advertise on assigned channels, the advertisements will be superimposed on the client data signals in a way that does not interfere with the client data services. Depending on the nature of specific client signals, this may not always be possible.

In such an alternative embodiment, the OLT 110 includes optical ports able to superimpose such advertisements outside the normal data channel. For example, a low-frequency amplitude modulation of the signal might be invisible to the client traffic, but detectable as a separate channel for the purpose of conveying advertisements. Moreover, the benefit of a common out-of-band modulation arrangement is that any ONU 120 can read the advertisements if it has the ability to demodulate the out-of-band modulation, even if it cannot demodulate the client signal present on that wavelength. A further benefit of this arrangement is that a single channel, regardless of modulation, may be used to convey all advertisements for the PON, rather than the potentially less efficient means of advertising each ICH group in the native format of that ICH group.

In one embodiment, the initialization time of the ONUs 120 can be further reduced by pre-configuring or standardizing the ONUs 120 with information on which channel or channels the OLT 110 will always use, or will preferentially use, for advertisements.

In any PON (such as the PON 100), there may be contention for resources among ONUs 120 trying to be connected to the OLTs 110. The contention can occur when the ONU 120 is connected for the first time (e.g., at deployment), and when the ONU 120 is trying to be reconnected, e.g., after recovery from power failure or fiber break.

In the case that two or more ONUs transmit registration requests at approximately the same time, the OLT may be adapted to detect the contention. In case the OLT was able to identify one particular requesting ONU from the contending group, the OLT may assign the free channel to the ONU that was identified, and then advertise a different free channel.

If a given ONU is not recognized from its registration request, it may be adapted to enter an exponential backoff mode before attempting to register again. Should the ONU receive an advertisement for a free channel that differed from the previously advertised free channel, the ONU may be adapted to cancel its exponential backoff and attempt to register normally.

As will be described in greater detail below in connection with FIGS. 7-11, multiple OLTs can be used on the same PON to support downstream advertisements. If an OLT is not capable of advertising on its own, another OLT may advertise as a proxy or broker for the incapable OLT.

It cannot be assumed that all ONUs are capable of recognizing and responding to advertisements. Channel assignments for an ONU that is incapable of recognizing and/or responding to advertisements can be manually provisioned, and the assigned channels can accordingly be removed from the pool of channels available for advertisement.

Figure 4:
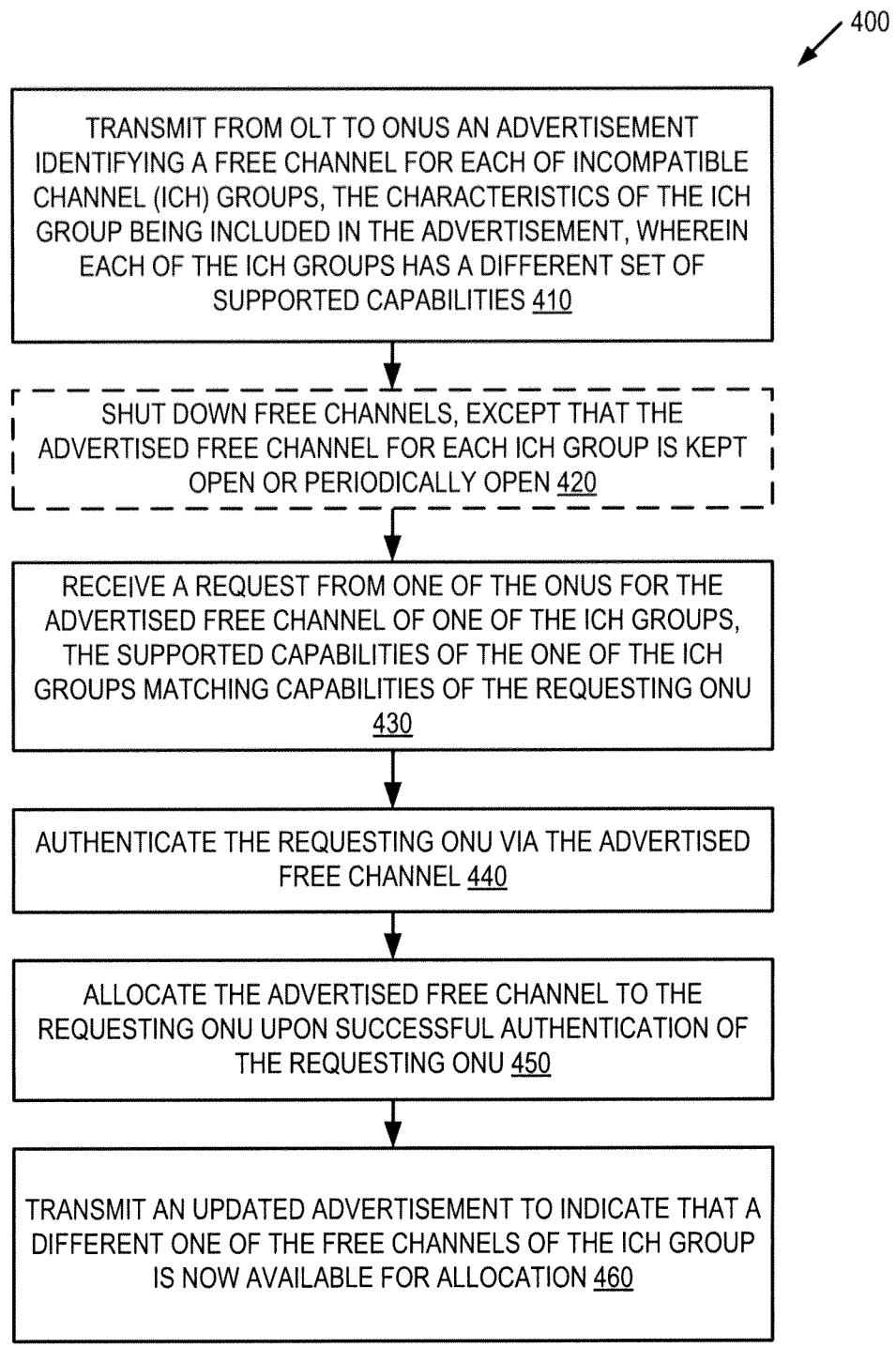
FIG. 4 is a flowchart of one embodiment of a method performed by an OLT for providing advertisements to the ONUs.

FIG. 4 is a flowchart of one embodiment of a method 400 performed by the OLT 110 for providing advertisements to the ONUs 120, where the advertisements enable the ONUs 120 to identify suitable ICH groups and associated free channels. In one embodiment, the OLT 110 transmits to the ONUs 120 an advertisement identifying a free channel for each of the ICH groups (block 410). The characteristics of the ICH group are included in the advertisement. Each of the ICH groups has a different set of supported capabilities. In one embodiment, the OLT 110 transmits the advertisements on a periodic basis. In an alternative embodiment, the OLT 110 transmits the advertisements continuously. In one embodiment the OLT 110 shuts down the free channels, except that the advertised free channel for each ICH group is kept open or periodically open (block 420).

Subsequently, the OLT 110 receives a request from one of the ONUs 120 (the requesting ONU) for the advertised free channel of an ICH group (block 430). The requesting ONU requests the allocation of the advertised free channel because the supported capabilities of the ICH group match its needs. The request includes an identifier of the requesting ONU (and, in some embodiments, may also request additional service parameters such as choice of FEC or encryption). If the OLT 110 detects that more than one ONU is transmitting a request for the advertised free channel, the OLT 110 may choose to allocate the free channel to one of the contending ONUs, or may not allocate it at all. If the OLT 110 does not choose one of the contending ONUs to allocate the free channel, the contending ONUs can enter an exponential backoff mode when resending their subsequent requests until one of them successfully obtains the allocation of the free channel. If only one ONU is requesting the advertised free channel, the OLT 110 authenticates the requesting ONU upon receipt of the request via the advertised free channel (block 440). It is understood that the process of authentication may be more or less rigorous, depending on the business policies of the network provider. The essence of the authentication process is to identify the ONU with sufficient certitude to bill the proper customer for the service. If the requesting ONU is successfully authenticated, the OLT 110 allocates the advertised free channel to the requesting ONU (block 450). The OLT 110 then opens up another free channel in the same ICH group. The OLT 110 transmits an updated advertisement to the ONUs 120, where the updated advertisement indicates that a different free channel is now available for allocation for the ICH group (block 460).

In some embodiments, the OLT 110 can transmit the advertisement for an ICH group on the advertised free channel. After that free channel is allocated to a requesting ONU, the OLT 110 opens up another free channel in the same ICH group and transmits the updated advertisement on that newly-opened free channel. In alternative embodiments, the OLT 110 can retain a free channel as an advertisement channel for an ICH group. In such an embodiment, this advertisement channel is the last channel to be allocated in the ICH group. After all channels in that ICH group are allocated, the OLT 110 transmits a no-channels-available form of advertisement, either on one or all of the channels of the ICH group. In another embodiment where it is not possible to send the no-channels-available advertisement after all of the channels for a given ICH group have been allocated, the OLT 110 may cease to issue advertisements for that given ICH group.

Figure 5:
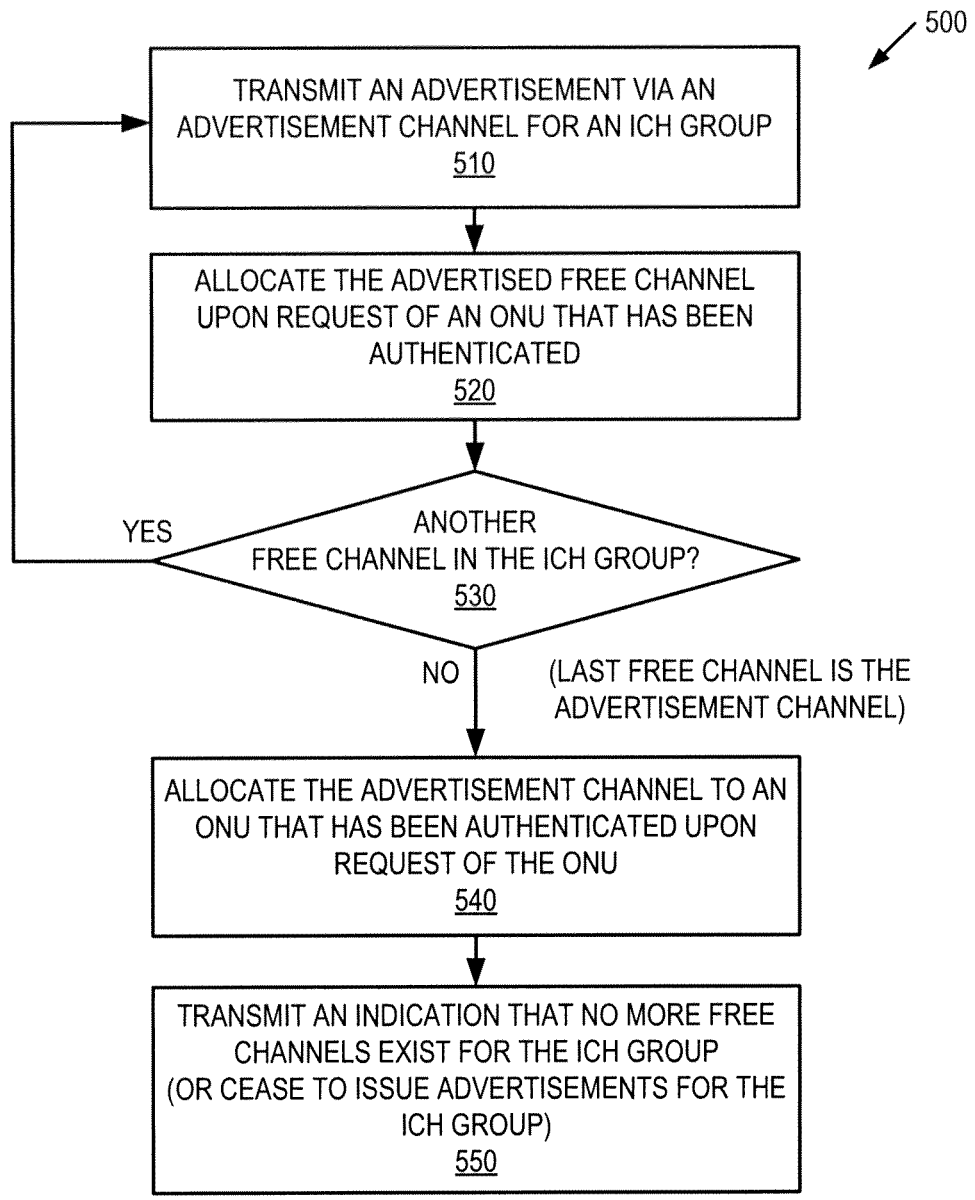
FIG. 5 is a flowchart of one embodiment of a method performed by an OLT that allocates an advertisement channel when it is the last free channel in an ICH group.

FIG. 5 is a flowchart of one embodiment of a method 500 performed by the OLT 110 that allocates an advertisement channel when it is the last free channel in an ICH group. In one embodiment, the OLT 110 transmits advertisements via an advertisement channel for each ICH group (block 510). Upon receipt of a request for a free channel of an ICH group from the ONU 120, the OLT 110 authenticates the requesting ONU. The OLT 110 allocates the advertised free channel in the requested ICH group if the requesting ONU authenticated (block 520). If there is another free channel in the ICH group (block 530), the operations of blocks 510 and 520 are repeated until all of the free channels in the ICH group, except the advertisement channel of that ICH group, have been allocated to ONUs. At this point, in response to a request for yet another channel allocation in the same ICH group, the OLT 110 allocates the advertisement channel itself as the free channel to the requesting ONU, subsequent to its authentication (block 540). The OLT 110 then ceases to issue advertisements for the ICH group after all of its channels for that ICH group have been allocated; or, alternatively, transmits an indication that no more free channels exist for that ICH group (block 550). After the last channel for the ICH group is allocated, the next ONU will fail to find an advertisement for the ICH channel and cannot register within this particular ICH group. It may be able to register in some other ICH group, for example with a different service provider or with an alternative protocol; or it may be unable to obtain service.

Figure 6:
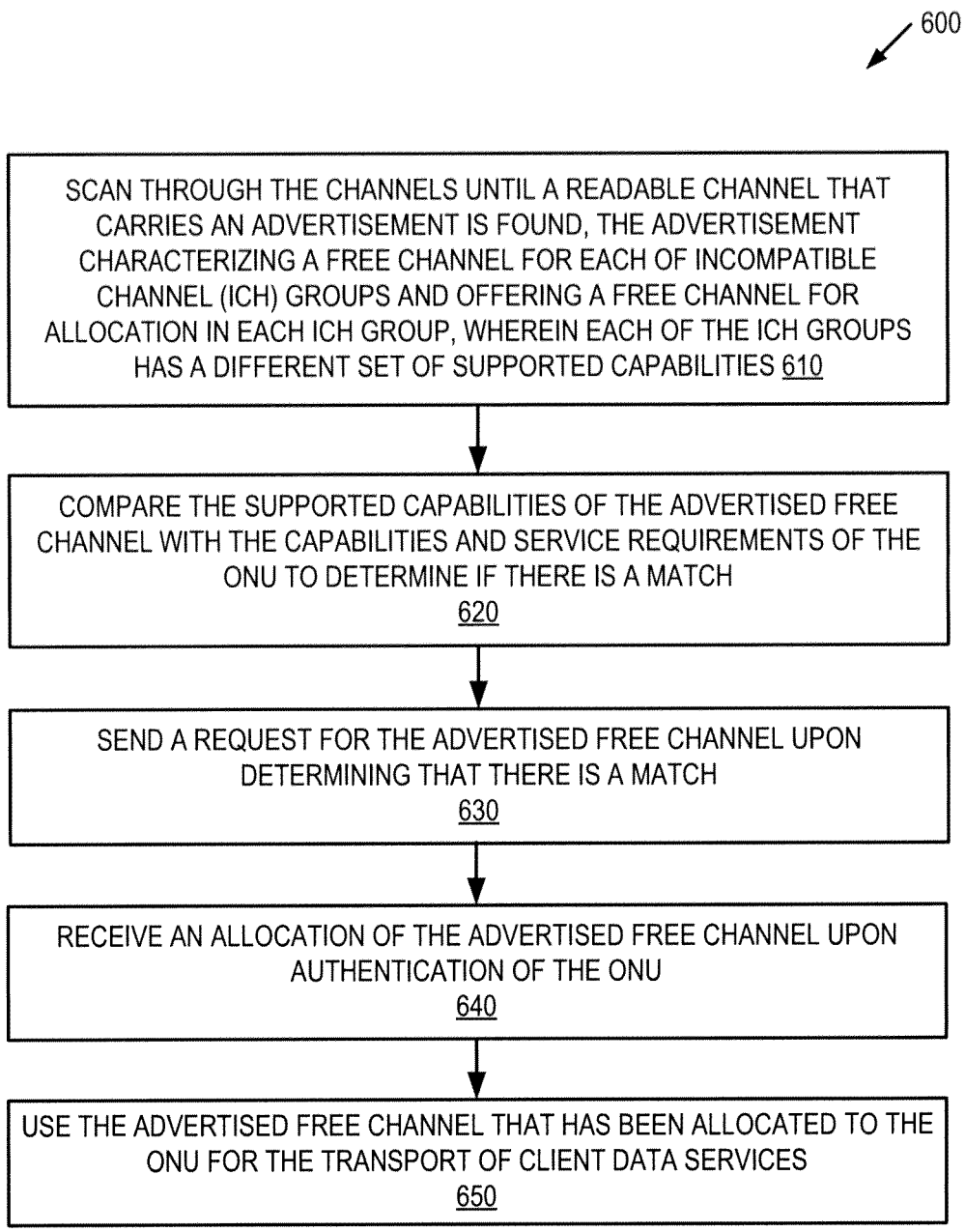
FIG. 6 is a flowchart of one embodiment of a method performed by the ONU for fast initialization.

FIG. 6 is a flowchart of one embodiment of a method 600 performed by the GNU 120 for fast initialization. A more detailed description of the operations and states of the GNU 120 is presented later in connection with FIG. 12. In one embodiment, the method 600 is initiated when the ONU 120 needs to establish a connection with the OLT 110. The GNU 120 scans through the channels until a readable channel that carries an advertisement is found (block 610). The advertisement characterizes one or more ICH groups and offers a free channel for allocation each ICH group. Each of the ICH groups has a different set of supported capabilities. After the ONU 120 reads the advertisement, the ONU 120 compares the capabilities of the advertised ICH group with its needs (e.g., its capabilities and service requirements) to determine if there is a match (block 620). Upon determination that there is a match, the ONU sends a request for the advertised free channel (block 630). Subsequent to authentication, which could involve additional message exchanges, e.g., exchange of credentials, the ONU 120 receives the allocation of the advertised free channel (block 640). The data exchange until this point has been exchange of negotiation data. After the ONU 120 receives the channel allocation, the ONU 120 starts using the newly allocated channel for the transport of client data services (block 650). The term "client data" hereinafter refers to the data transported on an allocated channel, after the initial negotiation phase during which an ONU acquires the channel allocation. The term "client data" is to be distinguished from the "negotiation data" that is sent during the initial negotiation phase.

In one embodiment, the PON 100 includes multiple OLTs 110 and each OLT 110 leases or owns a fixed set of channels and advertises its own set. However, in a multi-service-provider (unbundling) scenario, it may be beneficial to have a shared pool of wavelengths rather than fixed assigned sets. This is because a service provider may not know how many subscribers (ONUs) it may attract and in any event, the service provider will wish to avoid having to pay for unused channels.

Figure 7:
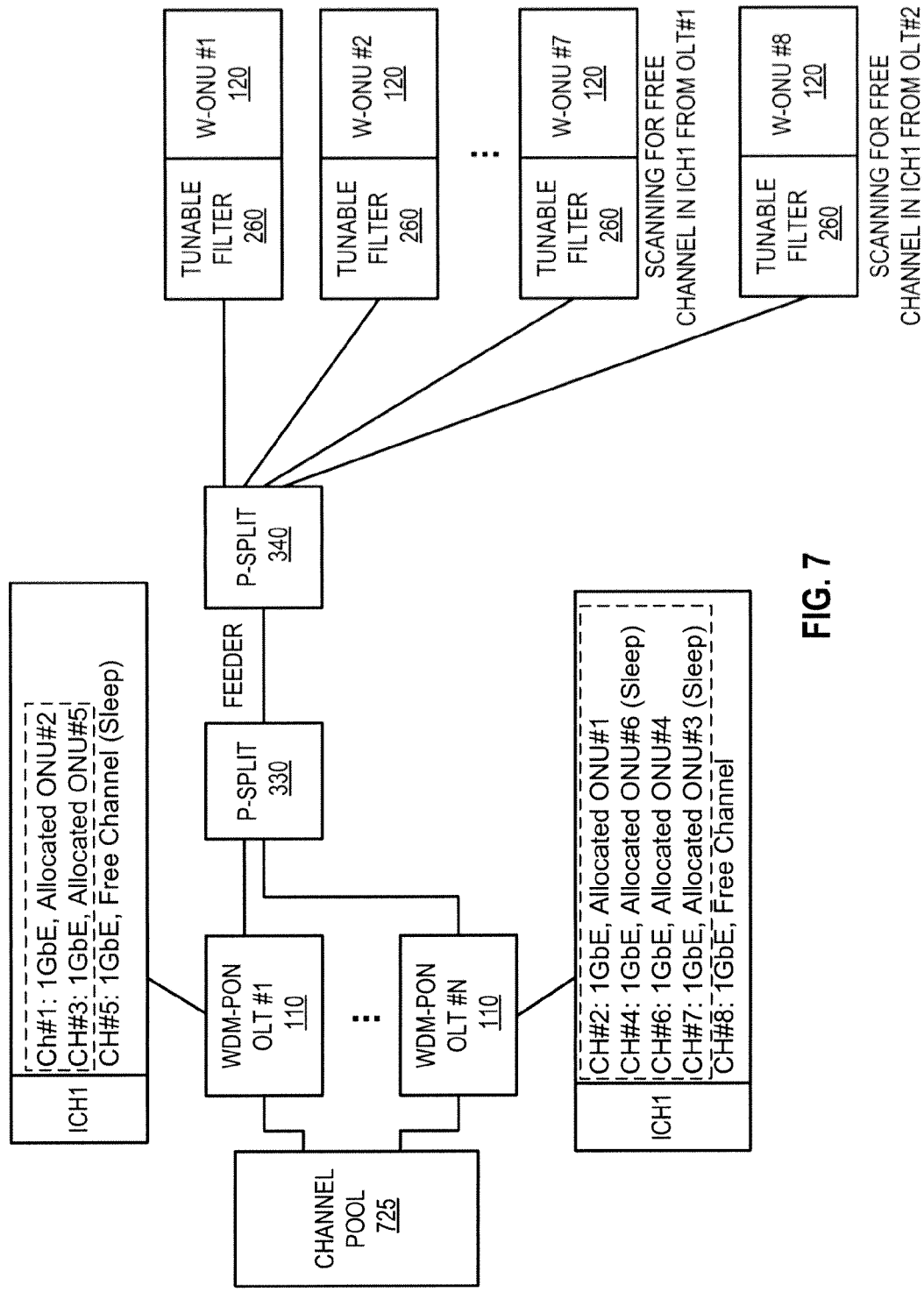
FIG. 7 is a diagram of one embodiment of a network architecture illustrating multiple OLTs coordinating their advertisements.

FIG. 7 is a diagram of one embodiment of a network architecture illustrating multiple OLTs 110 (only two are shown as an example) coordinating their advertisements. In one embodiment, a group of OLTs 110 leases or owns a shared pool of channels ("channel pool" 725). The OLTs 110 in the group negotiate with each other so that each offers a unique free channel to the ONUs 120 in its scope. An ONU 120 is exposed to advertisements from all (both) OLTs 110 and may respond to whichever advertisements suit its ICH preferences.

Figure 8:
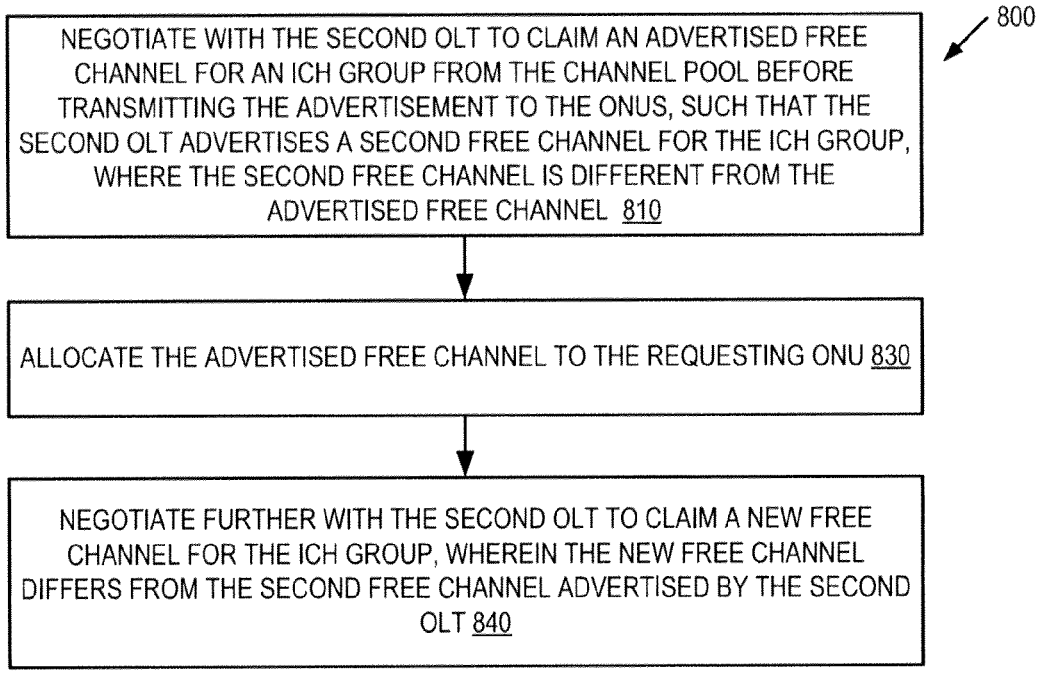
FIG. 8 is a flowchart of one embodiment of a method performed by an OLT that shares a channel pool with one or more other OLTs.

FIG. 8 is a flowchart of one embodiment of a method 800 performed by the OLT 110 that shares the channel pool 725 with one or more other OLTs 110 (e.g., a second OLT). The OLT 110 and the second OLT each advertise free channels, but not the same free channels, for their respective ICH groups. To assure that the OLTs do not advertise the same free channel, each OLT has to claim a free channel from the channel pool 725 before advertising it. In one embodiment, the OLT 110 negotiates with the second OLT to claim an advertised free channel for an ICH group from the channel pool 725 before transmitting the advertisement to the ONUs 120, such that the second OLT advertises a second free channel for the ICH group, where the second free channel is different from the advertised free channel (block 810). After a successful authentication process as described before, the OLT 110 allocates the advertised free channel to a requesting ONU (block 820). The OLT 110 then further negotiates with the second OLT to claim a new free channel for the ICH group from the channel pool 725, wherein the new free channel differs from the second free channel advertised by the second OLT (block 830). In one embodiment, some or all of the OLTs 110 sharing the channel pool 725 may negotiate channel allocation via a server coupled to the OLTs.

Figure 9:
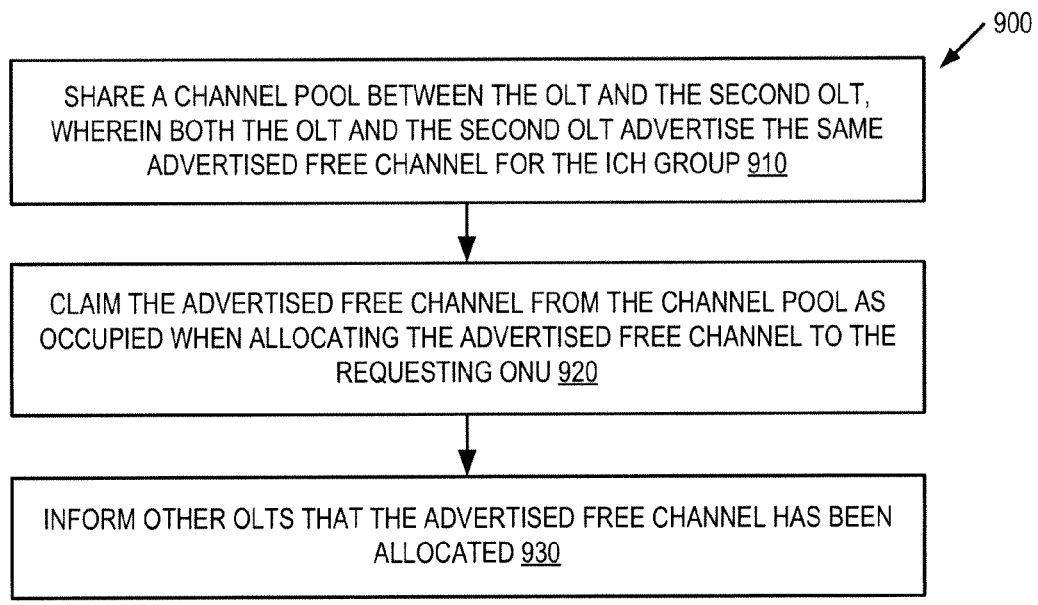
FIG. 9 is a flowchart of an alternative embodiment of a method performed by an OLT that shares a channel pool with one or more other OLTs.

FIG. 9 is a flowchart of an alternative embodiment of a method 900 performed by the OLT 110 that shares the channel pool 725 with one more other OLTs 110 (e.g., a second OLT). In this embodiment, the OLT 110 and the second OLT are allowed to advertise the same free channel (block 910). This requires negotiation between OLTs to agree on the advertised free channel, and to claim ownership of the free channel when one of the OLTs assigns it. The OLT 110 claims the advertised free channel from the channel pool 725 as occupied when allocating the advertised free channel to a requesting ONU (block 920). After the allocation, the OLT 110 informs the other OLTs that the advertised free channel has been allocated (block 930).

Figure 10:
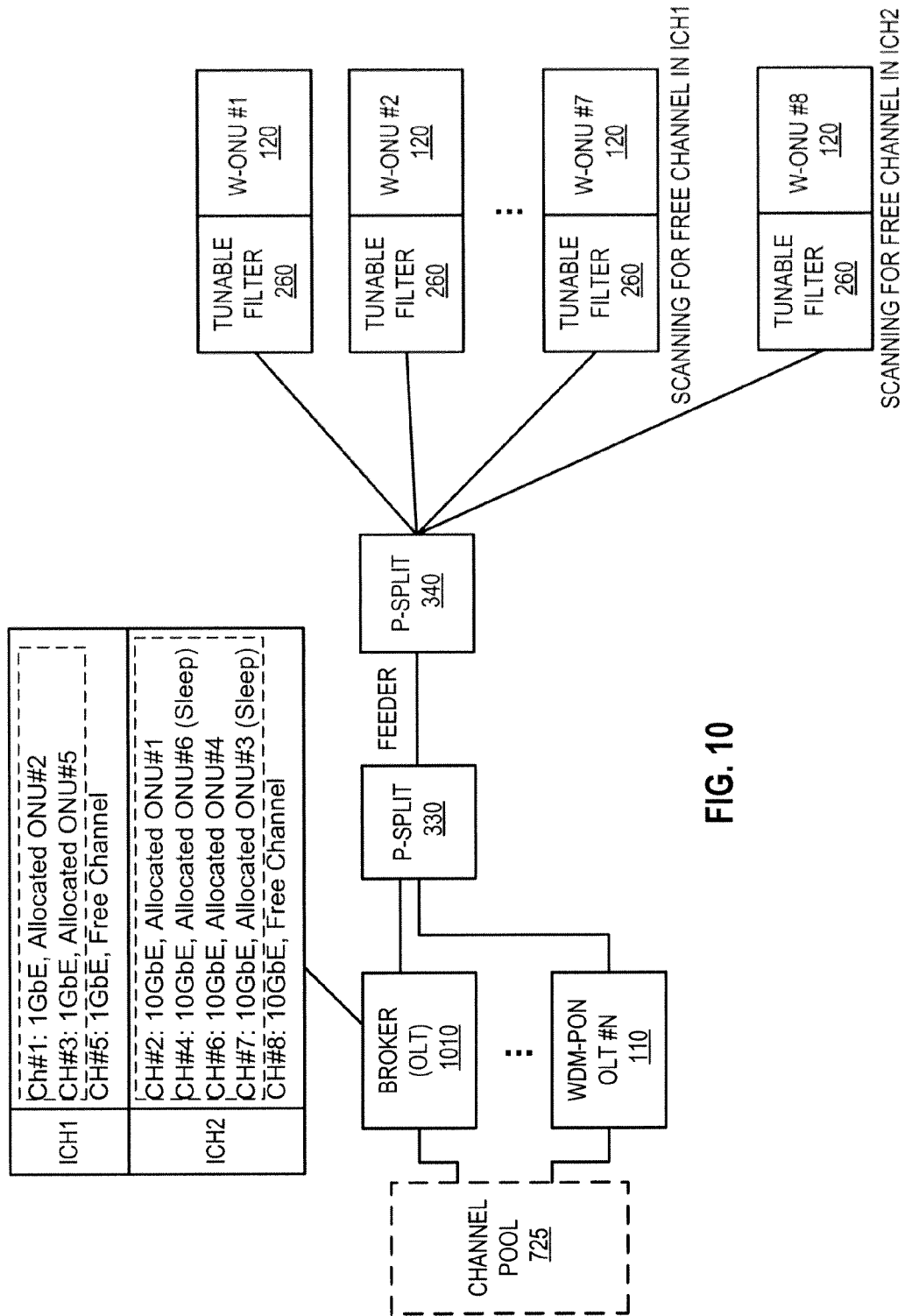
FIG. 10 is a diagram of one embodiment of a network architecture illustrating a broker OLT designated to coordinate the advertisements of multiple OLTs.

FIG. 10 is a diagram of one embodiment of a network architecture illustrating a broker OLT that is designated to coordinate the advertisements of multiple OLTs. In this embodiment, one of the OLTs 110 is designated as a broker 1010 that advertises on behalf of a plurality of the OLTs 110. In another scenario, another entity is designated as the broker 1010 for the OLTs 110 and advertises for a plurality of the OLTs 110 (e.g., some or all of the OLTs 110). This other entity may be a machine which is separate from and operates independently of the OLTs 110 in the PON 100, and is capable of communicating with the OLTs 110 and transmitting advertisements to the ONUs 120. In one embodiment, this other entity does not provide any free channels of its own. In one embodiment, the broker 1010 maintains a master list of channel allocations for all of the OLTs 110 on behalf of which it advertises. In one embodiment, the OLTs 110 (which include the broker OLT 1010) share the channel pool 725. In another embodiment, the OLTs 110 for which the broker 1010 advertises do not share the channel pool 725; rather, each OLT 110 has its own dedicated free channels, which are nevertheless advertised and allocated by the broker.

In one embodiment, the broker 1010 can be a broker for all ICH groups, or for a subset of ICH groups. That is, only a single advertisement for multiple ICH groups will be sent to the ONUs 120. The use of a broker can be beneficial in many scenarios. For example, one such scenario is where all channels run the same protocol (e.g., GbE) and the ICH groups are distinguished primarily by their service providers. In another scenario where advertisements are conveyed by out-of-band modulation that can be recognized by all (or almost all) of the ONUs on the PON, only one OLT need have the ability to create the out-of-band modulated signal. In both of these scenarios, there are fewer advertisements in total and less clutter on the network.

Figure 11:
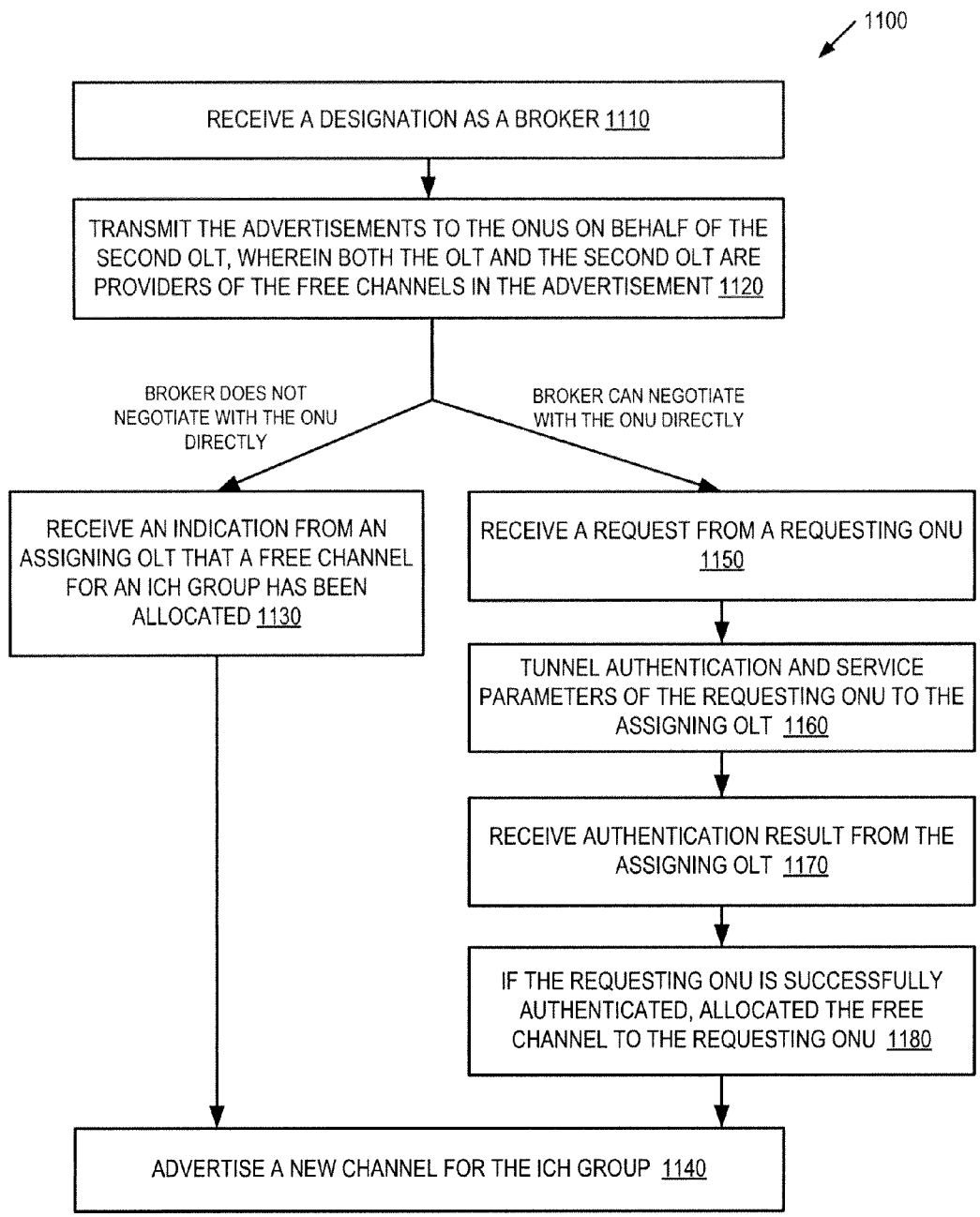
FIG. 11 is a flowchart of one embodiment of a method performed by a broker OLT for advertising a free channel.

FIG. 11 is a flowchart of one embodiment of a method 1100 performed by the broker 1010 (of FIG. 10) for advertising a free channel. In one embodiment, the method 1100 is triggered when one of the OLTs 110 receives a designation as the broker 1010 (block 1110). The broker 1010 transmits advertisements to the ONUs 120 on behalf of other OLTs 110 (e.g., a second OLT) in the PON 100 (block 1120). In one embodiment, both the broker 1010 and the second OLT (as well as the other OLTs 110, if any) can be providers of the free channels identified in the advertisement. In a first embodiment, the broker 1010 merely transmits the advertisements and does not negotiate with a requesting ONU directly. Registration and channel assignment occur between each OLT ("assigning OLT") and each requesting ONU directly. In this first embodiment, the assigning OLT informs the broker 1010 that the free channel for an ICH group has been assigned (block 1130), and the broker 1010 then advertises a new free channel for the ICH group (block 1140). In a second embodiment, the broker 1010 is capable of negotiating directly with a requesting ONU, but it may need to tunnel authentication and service parameters to the intended assigning OLT. In the second embodiment, after the broker 1010 transmits the advertisement, it receives a request from a requesting ONU (block 1150). The broker 1010 tunnels the authentication and service parameters of the requesting ONU to the assigning OLT (block 1160). Upon receipt of an authentication result from the assigning OLT (block 1170) indicating the authentication was successful, the broker 1010 allocates the free channel to the requesting ONU (block 1180). The broker 1010 then advertises a new free channel for the ICH group (block 1140). In a third embodiment (not shown), the broker 1010 may be capable of acting as a complete proxy for the assigning OLT. Following authentication of the requesting OLT and allocation of the free channel, the broker 1010 would then inform the assigning OLT of the new allocation and service.

Figure 12:
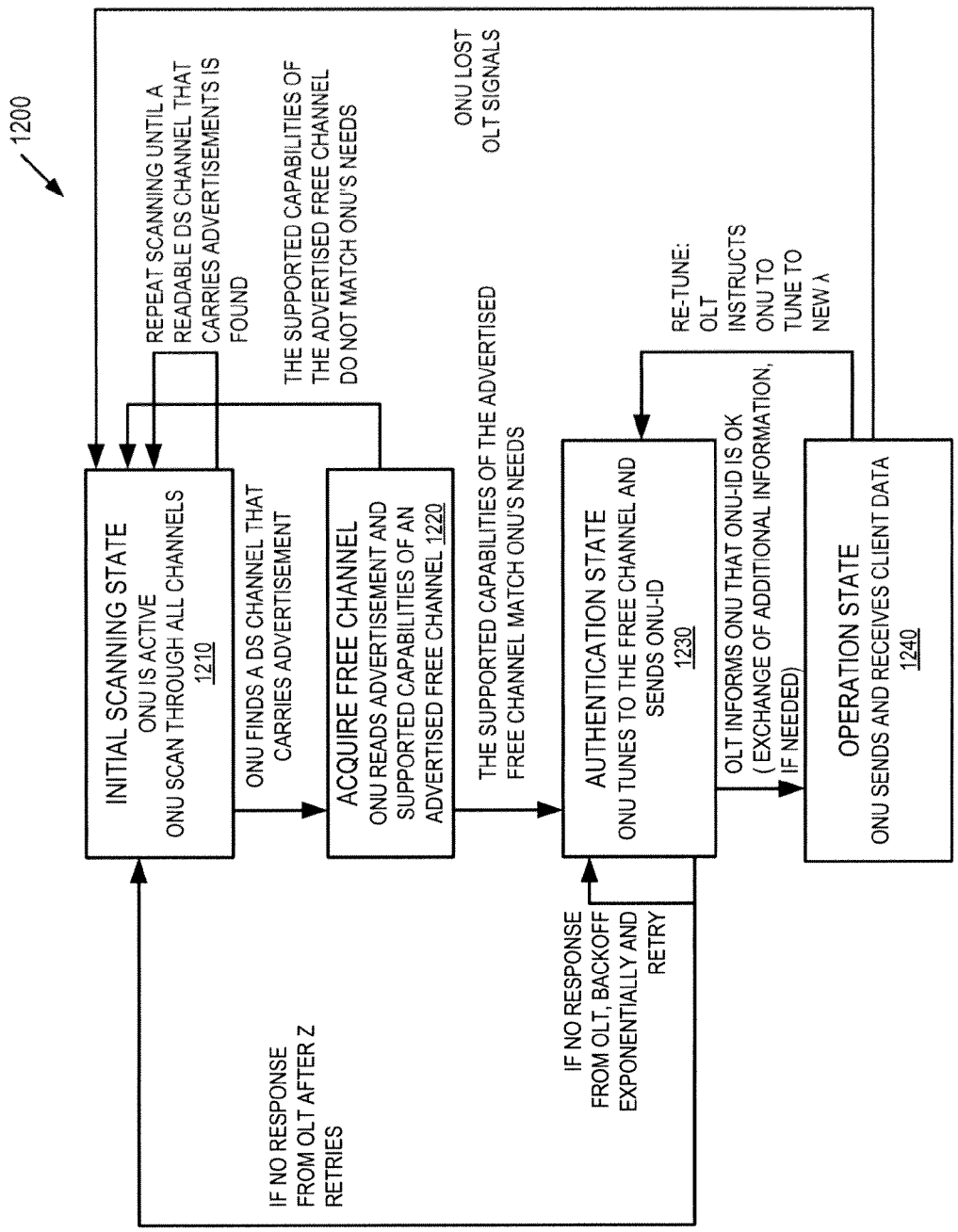
FIG. 12 illustrates one embodiment of a state diagram of an ONU.

FIG. 12 illustrates one embodiment of a state diagram 1200 of the ONU 120 in the PON 100.

In one embodiment, the ONU 120 starts with an "initial scanning state" 1210, in which the ONU 120 is active and scans through all or a subset of the channels. If the ONU 120 cannot find a readable channel after scanning through all of the channels, it repeats this scanning process indefinitely. The state transitions to an "acquire free channel state" 1220 when the ONU 120 acquires a readable channel that carries an advertisement. In state 1220, the ONU 120 reads the advertisement and determines whether the supported capabilities of an advertised free channel match the needs (e.g., the capabilities and service requirements) of the ONU 120; for example, with respect to the data rate, protocol, wavelength, service provider, service type, error correction mode, and encryption scheme. If there is no match, the state of the ONU 120 moves back to the initial scanning state 1210, seeking additional advertisements. If there is an ICH group match, the state transitions to the "authentication state" 1230, in which the ONU 120 tunes to the free channel and sends its ONU-ID. Authentication and encryption information and other desired service parameters, if any, can be exchanged at this point. If the ONU 120 receives a response from the OLT 110 that it is authenticated and that the advertised free channel has been allocated to the ONU 120, its state transitions to an "operation state" 1240, in which the ONU 120 sends and receives client data. If the ONU 120 does not receive a response from the OLT 110, it backs off exponentially and re-tries. If the ONU 120 has repeatedly failed to register for after z attempts (where z is a configurable number), the state transitions back to the initial scanning state 1210.

During the operation state 1240, and subject to the continuing availability of a message channel, the OLT 110 may be able to re-tune the ONU 120 by instructing the ONU 120 to tune to a new wavelength. Re-tuning causes a state transition back to the authentication state 1230 where the ONU 120 is authenticated again. If the ONU 120 loses the OLT 110 signal during the operation state 1240, its state moves back to the initial scanning state 1210.

Thus, a method, system and apparatus for fast initialization of ONUs has been described. It is to be understood that the techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices, and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is apiece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premises equipment coupled to an access network (wired or wirelessly) to edge network elements, which are coupled (e.g., through one or more core network elements to other edge network elements) to other end stations (e.g., server end stations).

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of providing advertisements to optical network units (ONUs) by an optical line terminal (OLT), wherein the advertisements enable the ONUs to identify free channels from a plurality of wavelength-division multiplexing (WDM) channels in a passive optical network (PON), the method comprising the steps of:
   transmitting from the OLT to the ONUs an advertisement identifying a free channel for each of a plurality of incompatible channel (ICH) groups, the characteristics of the ICH group being included in the advertisement, wherein each of the ICH groups has a different set of supported capabilities;
   receiving a request from one of the ONUs for the advertised free channel of one of the ICH groups, the supported capabilities of the one of the ICH groups matching capabilities and service requirements of the requesting ONU;
   authenticating the requesting ONU via the advertised free channel;
   allocating the advertised free channel to the requesting ONU upon successful authentication of the requesting ONU; and
   transmitting an updated advertisement from the OLT to the ONUs, the updated advertisement to indicate that a different one of the free channels is now available for allocation for the ICH group.

2. The method of claim 1, further comprising the step of:
   shutting down unallocated channels except that the advertised free channel for each of the ICH groups is kept open or is periodically opened.

3. The method of claim 1, further comprising the steps of:
   transmitting the advertisement via an advertisement channel for the ICH group;
   allocating the advertisement channel as the advertised free channel for the ICH group; and
   ceasing to advertise any free channel for the ICH group when there is no other free channel in the ICH group.

4. The method of claim 1, further comprising the step of:
   transmitting the advertisement using an out-of-band modulation superimposed on one or more active channels in one or more of the ICH groups.

5. The method of claim 1, wherein the advertisement comprises information of allocated channels in each of the ICH groups.

6. The method of claim 1, wherein the PON includes a second OLT that shares a channel pool with the OLT, the method further comprising the steps of:
   negotiating with the second OLT to claim the advertised free channel for the ICH group from the channel pool before transmitting the advertisement to the ONUs, such that the second OLT advertises a second free channel for the ICH group, wherein the second free channel is different from the advertised free channel;
   allocating the advertised free channel to the requesting ONU; and
   negotiating further with the second OLT to claim a new free channel that differs from the second free channel advertised by the second OLT.

7. The method of claim 1, wherein the PON includes a second OLT, the method further comprising the steps of:
   sharing a channel pool between the OLT and the second OLT, wherein both the OLT and the second OLT advertise the same advertised free channel for the ICH group;
   claiming, by the OLT, the advertised free channel from the channel pool as occupied when allocating the advertised free channel to the requesting ONU; and
   informing other OLTs in the PON that the advertised free channel has been allocated.

8. The method of claim 1, wherein the PON comprises a second OLT, the method comprising the steps of:
   receiving, by the OLT, a designation as a broker OLT; and
   transmitting the advertisements to the ONUs on behalf of the second OLT, wherein both the OLT and the second OLT are providers of the free channels in the advertisement.

9. The method of claim 1, wherein the PON comprises a plurality of OLTs and a machine designated as a broker, the method comprising the steps of:
   transmitting the advertisements from the machine to the ONUs on behalf of the plurality of OLTs, wherein the plurality of OLTs are providers of the free channels in the advertisement and the machine does not provide any free channels of its own.

10. A network element of an optical line terminal (OLT) that provides advertisements to optical network units (ONUs), wherein the advertisements enable the ONUs to identify incompatible channel (ICH) groups and a free channel in each ICH group from a plurality of wavelength-division multiplexing (WDM) channels in a passive optical network (PON), the OLT comprising:
   a transmitter adapted to transmit to the ONUs an advertisement characterizing a plurality of incompatible channel (ICH) groups and identifying a free channel for each ICH group, wherein each of the ICH groups has a different set of supported capabilities;
   a receiver adapted to receive from one of the ONUs for the advertised free channel of one of the ICH groups, identification information of the requesting ONU; and
   a processor coupled to the receiver and the transmitter, the processor adapted to authenticate the requesting ONU via the advertised free channel, allocate the advertised free channel to the requesting ONU upon successful authentication of the requesting ONU, and transmit an updated advertisement to indicate that a different one of the free channels in the ICH group is now available for allocation.

11. The network element of claim 10, wherein the processor is further adapted to shut down the free channels except that the advertised free channel for each of the ICH groups is kept open or periodically open.

12. The network element of claim 10, wherein the advertisement characterizing the incompatible channel groups comprises one or more of the following: a data rate, a protocol, a wavelength, a service provider, a service type, an error correction mode, and an encryption scheme.

13. The network element of claim 10, wherein the transmitter is further adapted to transmit the advertisement via an advertisement channel for the ICH group.

14. The network element of claim 10, wherein the transmitter is further adapted to transmit the advertisement using an out-of-band modulation imposed on one or more free or active channels of one or more of the ICH groups.

15. The network element of claim 10, wherein the PON includes a second OLT that shares a channel pool with the OLT, the processor of the OLT being further adapted to:
   negotiate with the second OLT to claim the advertised free channel for the ICH group from the channel pool before transmitting the advertisement to the ONUs, such that the second OLT advertises a second free channel for the ICH group, wherein the second free channel is different from the advertised free channel of the OLT for the ICH group;
   allocate the advertised free channel to the requesting ONU; and
   negotiate further with the second OLT to claim a new free channel that differs from the second free channel advertised by the second OLT.

16. The network element of claim 10, wherein the PON includes a second OLT, the processor of the OLT being further adapted to:
   share a channel pool with the second OLT, wherein both the OLT and the second OLT advertise the same advertised free channel for the ICH group;
   claim the advertised free channel from the channel pool as occupied when allocating the advertised free channel to the requesting ONU; and
   inform the second OLT in the PON that the advertised free channel has been allocated.

17. The network element of claim 10, wherein the PON comprises a second OLT, the processor of the OLT being further adapted to:
   receive a designation as a broker OLT; and
   transmit the advertisements to the ONUs on behalf of the second OLT, wherein both the OLT and the second OLT are providers of the free channels in the advertisement.

18. The network element of claim 10, wherein the PON comprises a plurality of OLTs and a machine designated as a broker, the broker being adapted to:
   transmit the advertisements from the machine to the ONUs on behalf of the plurality of OLTs, wherein the plurality of OLTs are providers of the free channels in the advertisement and the machine does not provide any free channels of its own.

* * * * *